United States Patent
Fukumoto

(10) Patent No.: US 11,479,251 B2
(45) Date of Patent: Oct. 25, 2022

(54) VEHICLE CONTROL METHOD AND VEHICLE CONTROL DEVICE

(71) Applicant: Nissan Motor Co., Ltd., Yokohama (JP)

(72) Inventor: Yasuki Fukumoto, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 94 days.

(21) Appl. No.: 16/977,619

(22) PCT Filed: Apr. 5, 2018

(86) PCT No.: PCT/JP2018/014625
§ 371 (c)(1),
(2) Date: Sep. 2, 2020

(87) PCT Pub. No.: WO2019/193722
PCT Pub. Date: Oct. 10, 2019

(65) Prior Publication Data
US 2021/0039647 A1 Feb. 11, 2021

(51) Int. Cl.
*B60W 30/18* (2012.01)
*B60W 10/06* (2006.01)
(Continued)

(52) U.S. Cl.
CPC ...... *B60W 30/18154* (2013.01); *B60W 10/06* (2013.01); *B60W 30/16* (2013.01);
(Continued)

(58) Field of Classification Search
CPC ........... B60W 30/18154; B60W 10/06; B60W 30/16; B60W 30/18054; B60W 30/18063; B60W 2520/04; B60W 2710/0644; B60W 30/09; B60W 30/18027; B60W 30/18159; B60W 60/0017; B60W 2554/402; B60W 2554/4026; B60W 2554/4041; B60W 2554/4042; B60W 2554/80;
(Continued)

(56) References Cited

U.S. PATENT DOCUMENTS

2012/0029730 A1* 2/2012 Nagura ............... F02N 11/0837
701/2

FOREIGN PATENT DOCUMENTS

| EP | 2 416 003 A2 | 2/2012 |
| JP | 2013132932 A * | 7/2013 |
| JP | 2017-84115 A | 5/2017 |

* cited by examiner

*Primary Examiner* — Aniss Chad
*Assistant Examiner* — Chase L Cooley
(74) *Attorney, Agent, or Firm* — Global IP Counselors, LLP

(57) ABSTRACT

A vehicle control method is provided such that when a host vehicle is stopped at a front of a vehicle line of vehicles in accordance with a stop signal of a traffic light at an intersection, the engine is stopped by using an idle stop control. When either a left-turn or a right-turn will be made after the traffic light changes to a go signal, a presence or an absence of a traveling body, which is stopped on a side of or behind the host vehicle in a direction from which the host vehicle is turning, is detected during the stop signal. Upon determining the traveling body is stopped on the side of host vehicle, restarting of the engine is placed on standby even when the traffic light turns to the go signal, and the engine is restarted in accordance with a behavior of the traveling body.

6 Claims, 7 Drawing Sheets

(51) Int. Cl.
  *B60W 30/16* (2020.01)
  *G08G 1/01* (2006.01)
  *G08G 1/065* (2006.01)

(52) U.S. Cl.
  CPC ............... *B60W 30/18054* (2013.01); *B60W 30/18063* (2013.01); *G08G 1/0133* (2013.01); *G08G 1/065* (2013.01); *B60W 2520/04* (2013.01); *B60W 2710/0644* (2013.01)

(58) Field of Classification Search
  CPC ......... B60W 30/0956; B60W 2555/60; B60W 50/0097; G08G 1/0133; G08G 1/065; G08G 1/166; G08G 1/167; G01S 13/867; G01S 13/865; G01S 2013/9318; G01S 2013/93185; G01S 2013/9319; G01S 2013/9323; G01S 13/931; Y02T 10/40; F02N 11/0837; F02N 2200/125; F02D 2200/125
  See application file for complete search history.

VEHICLE CONTROL METHOD AND VEHICLE CONTROL DEVICE

CROSS-REFERENCE TO RELATED APPLICATIONS

This application is a U.S. national stage application of International Application No. PCT/JP2018/014625, filed on Apr. 5, 2018.

BACKGROUND

Technical Field

The present invention relates to a vehicle control method and a vehicle control device.

Background Information

JP2017-84115A discloses a control for predicting a host vehicle route based on the position of the host vehicle for each prescribed time in the future and another vehicle route based on the position of another vehicle for each prescribed time in the future in order to determine whether the timing at which the vehicles will pass a point of intersection at which the two routes intersect will be the same. The case will be considered in which the control is applied to a situation in which a host vehicle that had stopped at a red traffic light at an intersection for left-hand traffic starts when the light turns green and turns left at the intersection. In this situation, if a two-wheeled vehicle or the like is on the left side of the host vehicle or is approaching from the left rear side of the host vehicle, and the two-wheeled vehicle or the like passes straight through the intersection, the host vehicle route and the other vehicle route intersect. In such a case, if it could be determined whether the timings at which the host vehicle and the two-wheeled vehicle or the like pass through the point of intersection are the same by using the control disclosed in the document described above, when they are determined to be the same, safety can be ensured by adopting such measures as stopping the host vehicle before the point of intersection is reached.

SUMMARY

In order to improve fuel efficiency and reduce environmental impact, a so-called idle stop control is known in which an internal combustion engine is automatically stopped when a prescribed permission condition is met and automatically restarted when prescribed restoration condition is met. The permission condition is satisfied when, for example, all four of the following criteria are met: the accelerator pedal is not depressed, the brake pedal is depressed, the vehicle speed is at or below a first prescribed speed (for example, 0 km/h), and the vehicle has experienced a vehicle speed that is above a second prescribed speed (for example, 10 km/h) after the previous automatic restart (hereinafter referred to as vehicle speed experience) The restoration condition, on the other hand, is satisfied when any one criterion of the permission condition is no longer met after the internal combustion engine has automatically stopped.

In a vehicle executing the idle stop control, when the vehicle is stopped at a red traffic light, the internal combustion engine is stopped; and when the traffic light turns green, the internal combustion engine is restarted and the vehicle starts to move. Then, if, after starting to move, the vehicle stops before the point of intersection in response to the approach of a two-wheeled vehicle, or the like; if the permission condition is met, the internal combustion engine is again stopped, and if the permission condition is not met, the engine remains idling while the vehicle is stopped.

After the vehicle has started moving from a stopped state at a red traffic light, it is unlikely that the vehicle speed experience criterion will be met before the vehicle reaches the point of intersection. That is, it is unlikely that the permission condition will become set. In this case, the idle state is continued until the two-wheeled vehicle, or the like, passes through the point of intersection, which would deteriorate fuel efficiency.

Even if the permission condition is satisfied, if the time until the restart is short (for example, less than 5 seconds), the amount of fuel required for the restart becomes greater than the amount of fuel that can be conserved by using the automatic stop, so that the fuel efficiency would deteriorate.

As described above, in a situation in which a vehicle is stopped at a red traffic light, and then starts moving when the traffic light turns green and then turns left at the intersection, the stopping again of the vehicle once inside the intersection after starting would lead to deterioration of fuel efficiency.

Given the problem described above, the object of the present invention is to ensure safety and suppress a deterioration of fuel efficiency, in a situation in which a vehicle is stopped at a red traffic light, and then starts moving when the traffic light turns green and turns left at the intersection.

According to one aspect of the present invention, a vehicle control method is provided that executes an idle stop control for stopping the engine if an idle stop permission condition is met. In this vehicle control method, when a host vehicle is stopped at the front of a line of vehicles in accordance with a stop signal of a traffic light at an intersection, the engine is stopped by using an idle stop control, and when the vehicle is to perform a left-turn operation on a left-hand traffic road or a right-turn operation on a right-hand traffic road at the intersection after the traffic light changes to a go signal, the presence or absence of a traveling body stopped on the side of or behind the host vehicle in the direction from which the host vehicle is turning, is detected during the stop signal. Then, if there is a traveling body stopped on the side of host vehicle, the restarting of the engine is placed on standby even when the traffic light turns to the go signal, and the engine is restarted in accordance with the behavior of the traveling body.

BRIEF DESCRIPTION OF THE DRAWINGS

Referring now to the attached drawings which form a part of this original disclosure.

DETAILED DESCRIPTION OF EMBODIMENTS

Embodiments of the present invention will be described below with reference to the drawings, etc.

Figure 1:
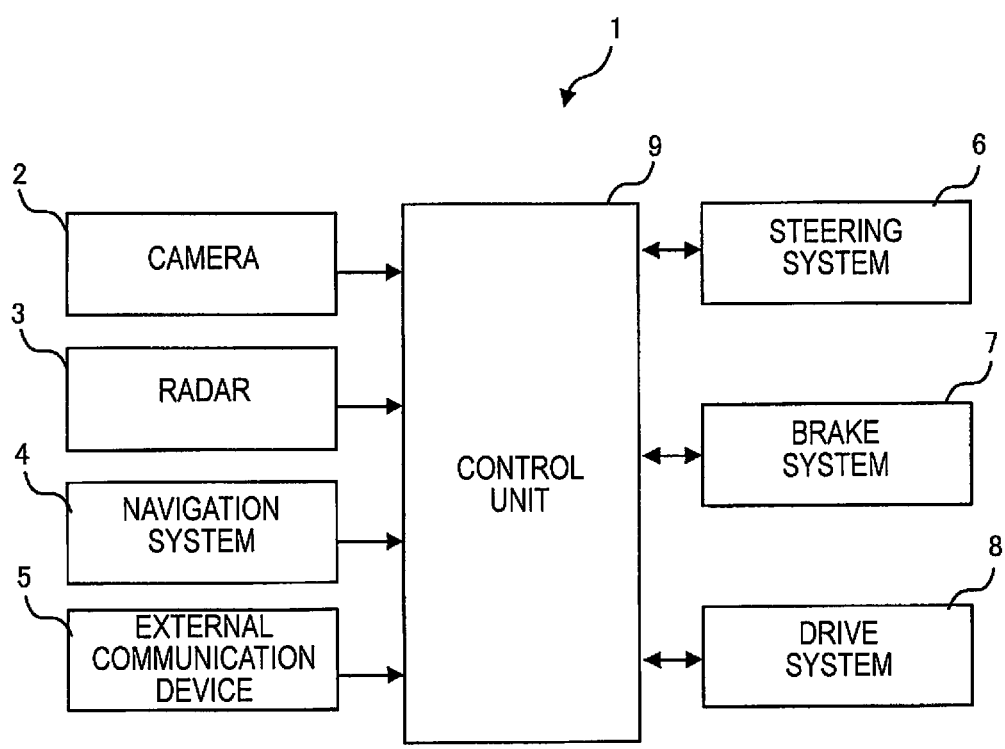
FIG. 1 is a block diagram illustrating a configuration of a vehicle control system 1.

FIG. 1 is a block diagram illustrating a configuration of a vehicle control system 1. The control system 1 is mounted on a vehicle and comprises a camera 2, a radar 3, a navigation system 4, an external communication device 5, a steering system 6, a brake system 7, a drive system 8, and a control unit 9.

The camera 2 photographs a region in the direction of travel of the vehicle, and outputs the captured image data to the control unit 9. The camera 2 functions as a traveling body detection unit and a signal detection unit.

The radar 3 irradiates, for example, a laser beam or millimeter waves to the vicinity of the host vehicle and receives the reflected waves. The radar 3 is disposed, for example, at the four corners of the vehicle body and at the front part of the vehicle body, computes the distance to an object in the vicinity of the host vehicle, the relative speed between the host vehicle and the object, the direction in which the object is located, and the like, based on the received reflected waves, and outputs this data to the control unit 9. The radar 3 functions as a traveling body detection unit, in the same manner as the camera 2. LIDAR (LIDAR: Light Detection and Ranging, Laser Imaging Detection and Ranging) may be used instead of the radar 3, or a radar and LiDAR may be used in combination.

The navigation system 4 includes a GPS receiver for receiving signals from Global Positioning System (GPS) satellites, and a map database that stores map information. The navigation system 4 recognizes the travel location of the host vehicle based on received GPS signals and the map database. In addition, the navigation system 4 sets a travel route to a destination that has been input.

The external communication device 5 is a wireless communication device that carried out vehicle-to-vehicle communication and/or road-to-vehicle communication and outputs the received information to the control unit 9. If it is possible to acquire the state of a traffic light by using the road-to-vehicle communication with the external communication device 5, the external communication device 5 may be used as a signal detection unit instead of the camera 2.

In addition to information associated with the vicinity of the host vehicle (hereinafter also simply referred to as "vicinity information") that can be obtained from the camera 2, the radar 3, the navigation system 4, and the external communication device 5, the control unit 9 also reads information from various other sensors (vehicle speed sensor, steering sensor, brake sensor, acceleration sensor, and the like), not shown. When performing autonomous driving, the control unit 9 causes a steering system 6, the brake system 7, and the drive system 8 to operate based on the various data described above.

The control unit 9 is composed of a microcomputer equipped with a central processing unit (CPU), read-only memory (ROM), random-access memory (RAM), and an input/output interface (I/O interface). The control unit 9 may also be composed of a plurality of microcomputers.

The steering system 6 is configured to include, for example, an electric power steering system, a steer-by-wire system, and the like, and a torque sensor. The torque sensor detects torque that a driver applies to the steering unit. In the case of manual driving in which the driver is the operator, the control unit 9 operates a steering actuator based on the detected value of the torque sensor. When executing autonomous driving, the control unit 9 causes the steering actuator to operate in accordance with a required steering angle determined based on the vicinity information.

The brake system 7 is configured to include a brake actuator and a brake sensor. The brake sensor detects the amount of depression of the brake pedal. In the case of manual driving, the control unit 9 causes the brake actuator to operate based on the detected value of the brake sensor. In the case of autonomous driving, the control unit 9 causes the brake actuator to operate based on a required braking amount determined based on the vicinity information.

The drive system 8 is configured to include an engine serving as a drive source, a throttle actuator, and an accelerator pedal sensor. The accelerator pedal sensor detects the amount of depression of the accelerator pedal. In the case of manual driving, the control unit 9 causes the throttle actuator to operate based on the detected value of the accelerator pedal sensor. In the case of autonomous driving, the control unit 9 causes the throttle actuator to operate based on a required output determined based on the vicinity information.

In addition, the control unit 9 executes so-called idle stop control (hereinafter also referred to as IS control), in which the engine is automatically stopped if an idle stop permission condition is satisfied, and the engine is restarted when the idle stop permission condition is no longer satisfied during the automatic stop. The idle stop permission condition is satisfied when, for example, all four of the following criteria are met: the accelerator pedal is not depressed, the brake pedal is depressed, the vehicle speed is at or below a first prescribed vehicle speed, and the vehicle speed experience is satisfied.

The first prescribed vehicle speed is about zero km/h, for example. However, in order to further enhance the fuel efficiency improvement effect, a vehicle speed greater than zero km/h may be set, so that the engine is automatically stopped before the vehicle stops.

The vehicle speed experience refers to a case in which the vehicle achieves a vehicle speed that is above a second prescribed vehicle speed from the time of the previous vehicle start to the present. The second prescribed vehicle speed is about 10 km/h, for example. The reason for including the vehicle speed experience in the idle stop permission condition is to avoid imparting discomfort to the passenger as a result of the frequent repeated stopping and restarting of the engine, in situations in which the vehicle is repeatedly started and stopped, such as during traffic jams.

In principle, under IS control, the engine is restarted when the idle stop permission condition is no longer satisfied during an automatic stop, as described above. However, if the IS control is executed in accordance with this principle at the time of a left turn on a left-hand traffic road or a right turn on a right-hand traffic road, the fuel efficiency could in fact deteriorate. The foregoing will be described with reference to FIGS. 2 and 3.

Figure 2:
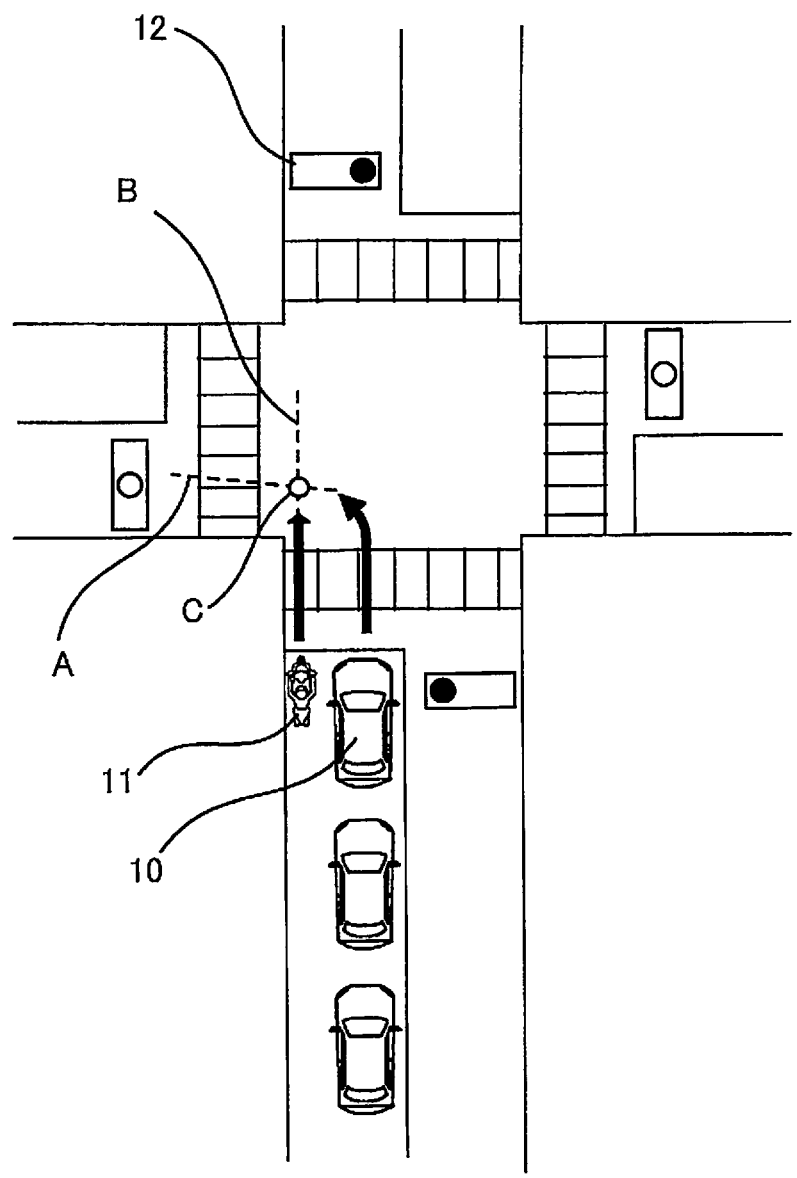
FIG. 2 is a bird's-eye-view of an intersection when a two-wheeled vehicle is stopped next to a host vehicle.

FIG. 2 illustrates a situation in which a traffic light 12 in the direction of travel of a host vehicle 10 at an intersection is a stop signal, and the host vehicle 10 is stopped in accordance with the stop signal at the front of a line of vehicles. The host vehicle 10 is turning left at the intersection when the traffic light 12 changes to a go signal. In addition, a traveling body, here, a two-wheeled vehicle 11, is stopped on the turning direction side of the host vehicle 10, that is, on the left side of the host vehicle 10. It is assumed that the two-wheeled vehicle 11 will pass straight through the intersection. The broken line A in the figure indicates the travel route (hereinafter also referred to as travel route A) of the host vehicle 10, and the broken line B indicates the travel route of the two-wheeled vehicle 11 (hereinafter also referred to as travel route B). In addition, the point of intersection C of the broken line A and the broken line B is referred to as left turn point C in the following description.

In the present embodiment, it is assumed that the two-wheeled vehicle 11 is a motorcycle, but it may also be a bicycle. In addition, the traveling body may be anybody that can travel on the left-hand side of a line of vehicles and is not limited to the two-wheeled vehicle 11. For example, three-wheeled motorcycles and humans are also to be considered traveling bodies. However, it is assumed in the description of the present embodiment that the traveling body is the two-wheeled vehicle 11.

If, after it is confirmed by using the camera 2 or the like that the traffic light 12 has changed to a go signal and the engine is immediately restarted and the vehicle starts moving, the host vehicle 10 and the two-wheeled vehicle 11 could, depending on the movement of the two-wheeled vehicle 11, reach the left turn point C simultaneously. In this case, if autonomous driving control is being executed, the two-wheeled vehicle 11 is detected by the camera 2 or the radar 3, and the control unit 9 stops the host vehicle 10 ahead of the left turn point C in order to ensure safety. Also, in the case of manual driving, if the two-wheeled vehicle 11 is detected, the driver stops the host vehicle 10 before reaching the left turn point C in order to ensure safety. That is, after the engine is restarted by using the IS control and the vehicle is restarted, the vehicle would again stop before reaching the left turn point C. At this time, if the vehicle speed experience has not taken place before the vehicle is again stopped, the engine is not stopped after the vehicle stops, so that the engine continues idling until the two-wheeled vehicle 11 has passed through the left turn point C, that is, until safety is ensured. In addition, even if the vehicle speed experience has taken place and the engine is stopped after the vehicle stops, if the time until safety is secured is short (for example, less than 5 seconds), the amount of fuel required for the restart becomes greater than the amount of fuel that can be conserved by stopping the engine. In either case, the fuel efficiency deteriorates.

Figure 3:
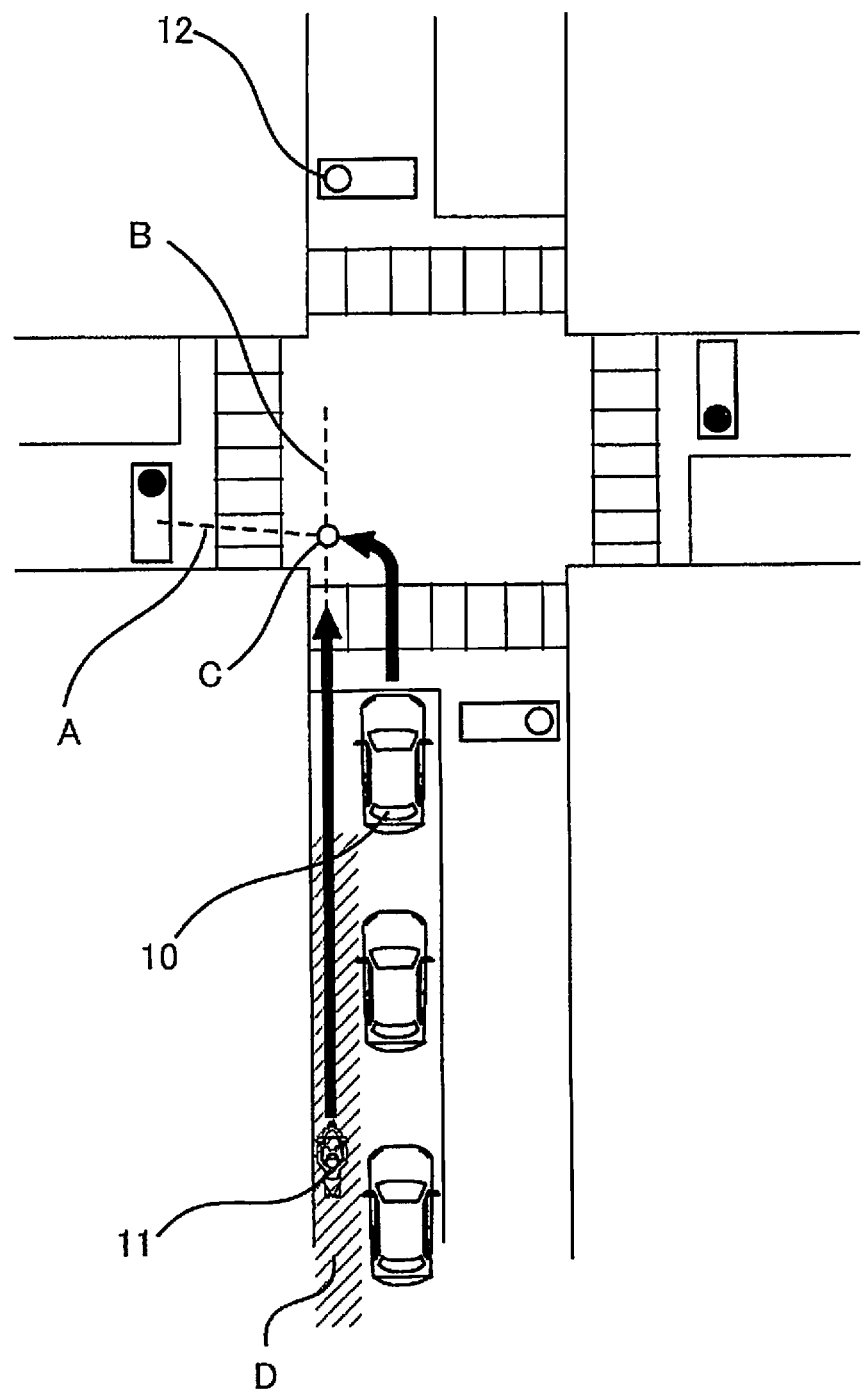
FIG. 3 is a bird's-eye-view of an intersection when a two-wheeled vehicle is approaching the host vehicle from behind.

FIG. 3 illustrates a situation in which the traffic light 12 in the direction of travel of the vehicle at an intersection changes from a stop signal to a go signal and immediately before the host vehicle 10 that has been stopped at the front of a line of vehicles enters the intersection. The two-wheeled vehicle 11 was in a position that could not be detected from the host vehicle 10 while the traffic light 12 was the stop signal, and is currently traveling in the area of the road on the left side of the line of vehicles. The shaded area D in the figure will be described further below.

As in FIG. 2, the broken line A in the figure indicates the travel route of the host vehicle 10, the broken line B indicates the travel route of the two-wheeled vehicle 11, and the point of intersection C of the broken line A and the broken line B is referred to as the left turn point C.

When the two-wheeled vehicle 11 is traveling on the left side of the line of vehicles at a speed higher than that of the line of vehicles, the host vehicle 10 and the two-wheeled vehicle 11 could reach the left turn point C simultaneously. That is, in the same manner as in the case of FIG. 2, the host vehicle 10 would stop before the left turn point C, which could deteriorate the fuel efficiency.

Therefore, in the present embodiment, the control routine described below is executed in order to suppress the above-described deterioration of fuel efficiency.

FIGS. 4-7 are flow charts illustrating control routines that are executed by the control unit 9 when the host vehicle 10 stops in accordance with a stop signal. In the following description, it is assumed that the control unit 9 is executing autonomous driving control. The autonomous driving control mentioned here refers to automatically performing, without driver operation, acceleration/deceleration control, including stopping and starting, and steering control, including turning left and right.

In addition, although FIGS. 4 to 7 show control routines for left-hand traffic, they may also be applied to right-hand traffic if "left" in FIGS. 4 to 7 is replaced with "right." A description will be given below according to the steps of the flow charts.

In Step S10, the control unit 9 determines whether the vehicle will turn left at the intersection. Specifically, the determination is made based on the operating state of the turn signal. "Left turn" here refers to changing course from the lane in which the vehicle is currently traveling on to a lane that intersects the lane in which the vehicle is currently traveling, in the left direction as seen from the lane in which the vehicle is currently traveling. A "left turn" is not limited to a change of course at a crossroads, as shown in FIGS. 2 and 3. For example, cases in which the above-described change of course is carried out at a T intersection or a five-forked road are also considered left turns.

If a left turn is to be executed, the control unit 9 performs the process of Step S20. Otherwise, the control unit 9 transitions to normal autonomous driving control in Step S110 and ends the present control routine. In the normal autonomous driving control, in addition to the acceleration/deceleration control and the steering control described above, control for ensuring safety, such as stopping the vehicle if an obstacle approaching the host vehicle 10 is detected and restarting the vehicle when the obstacle disappears, is also executed.

In Step S20, the control unit 9 determines whether the host vehicle 10 is stopped at the front of a line of vehicles. Specifically, the camera 2 or the radar 3 determines whether a vehicle is stopped in front of the host vehicle 10. If the host vehicle 10 is the vehicle in front, the process of Step S30 is executed; otherwise, the process of Step S110 is executed.

In Step S30, the control unit 9 uses the camera 2 or the radar 3 to determine whether a two-wheeled vehicle 11 is stopped on the left side of the host vehicle. If there is a stopped two-wheeled vehicle 11, the process of Step S40 is executed; otherwise the process of Step S120 is executed.

In Step S40, the control unit 9 uses the camera 2 or the radar 3 to determine whether the two-wheeled vehicle 11 is stopped behind the host vehicle 10. Here, behind the host vehicle 10 refers to the shaded area D in FIG. 3, that is, the area behind the host vehicle 10 with respect to the direction of travel in the area on the left side of the line of vehicles. The control unit 9 executes the process of Step S50 if the two-wheeled vehicle 11 is not present in the shaded area D, and, if present, transitions to normal autonomous driving control in Step S130 and ends the present control routine.

In Step S50, the control unit 9 determines whether the traffic light 12 has changed to a go signal. Specifically, the state of the traffic light 12 may be acquired by the camera 2, or the state of the traffic light 12 may be acquired by using road-to-vehicle communication using the external communication device 5.

The control unit 9 executes the process of Step S60 when it is detected that there is a change to a go signal; otherwise, the process of Step S50 is repeated until the change occurs.

Figure 5:
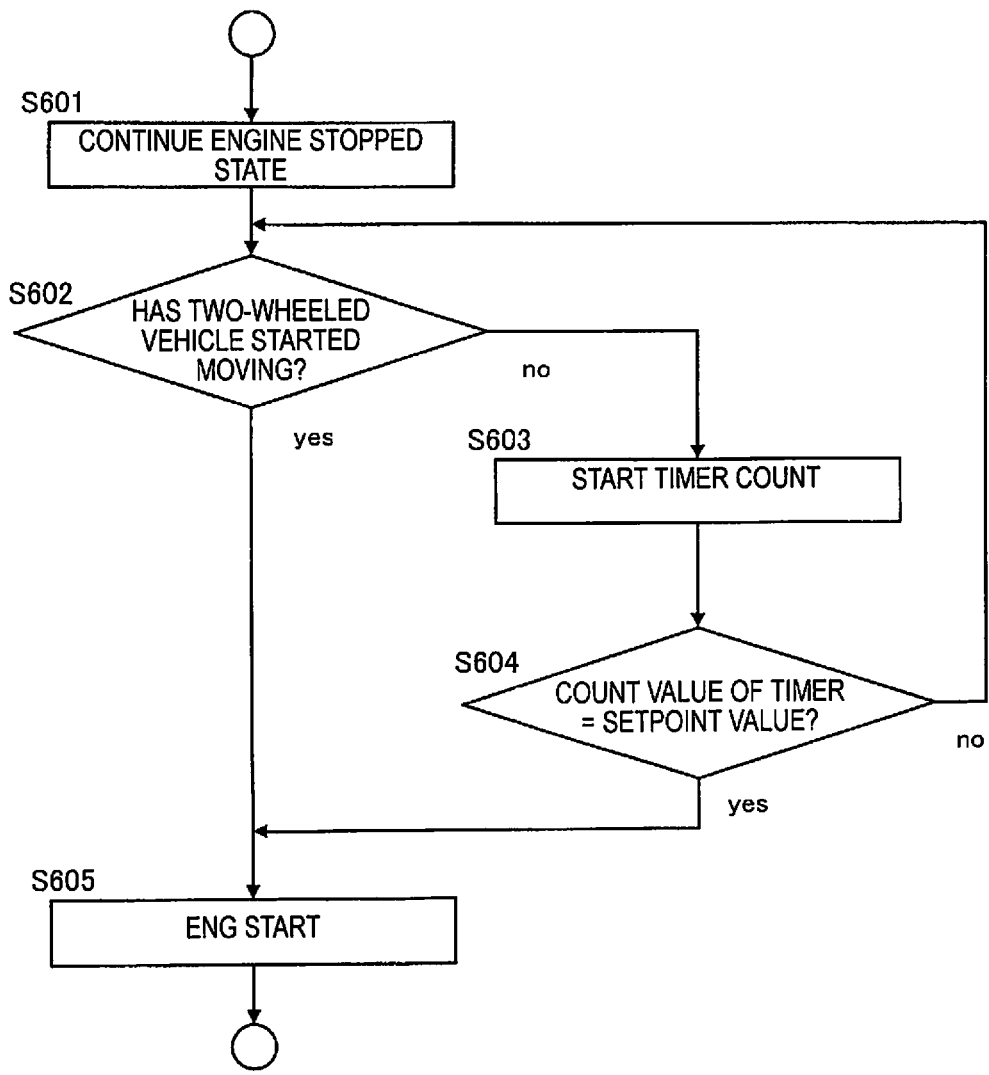
FIG. 5 is a flow chart illustrating a subroutine executed in Step S60 of FIG. 4.

In Step S60, the control unit 9 executes the subroutine shown in FIG. 5 in order to determine whether to permit an engine start. A description will be given below according to the steps of the subroutine of FIG. 5.

In Step S601, the control unit 9 continues the engine stopped state. That is, in the normal autonomous driving control, the engine is restarted when a go signal is detected, but in the present subroutine, the control unit 9 places the restarting of the engine on standby.

In Step S602, the control unit 9 determines whether the two-wheeled vehicle 11 that was stopped on the left side of the host vehicle 10 has started moving. If the two-wheeled vehicle 11 has started moving, the control unit 9 restarts the engine in Step S605 and ends the present subroutine, and, if it has not started moving, the control unit executes the process of Step S603.

In Step S603, the control unit 9 starts a count using an on-board timer.

In Step S604, the control unit 9 determines whether the count value of the timer has reached a setpoint value, and restarts the engine in Step S605 if the setpoint value has been reached and ends the present subroutine, and returns to the process of Step S602 if the setpoint value has not been reached. That is, the setpoint value is the upper limit value of the time to wait for the two-wheeled vehicle 11 to start moving. In the present embodiment, the setpoint value is about 5 seconds, for example.

As described above, in the present subroutine, while the engine remains in the stopped state, it is determined whether the two-wheeled vehicle 11 that was stopped on the left side of the host vehicle 10 has started moving, and, if it has, the engine is immediately restarted. The reason for this is that if the two-wheeled vehicle 11 starts moving before the host vehicle 10, even if the engine of the host vehicle 10 is immediately restarted thereafter and the movement of the vehicle is started, the two-wheeled vehicle 11 is likely to pass through the left turn point C before the host vehicle 10, so that it is not necessary for the engine to remain in the stopped state.

In addition, when the count value of the timer reaches the setpoint value, that is, when a prescribed period of time has elapsed, the engine is restarted even if the two-wheeled vehicle 11 has not started moving. The reason for doing so is that an indefinite continuation of the engine stopped state after the traffic light has changed to a go signal would hinder the smooth flow of traffic. In the present embodiment, the setpoint value is about 5 seconds, as described above; this is one example of a period of time that is considered not to hinder the smooth flow of traffic, and no limitations are imposed thereby.

Figure 4:
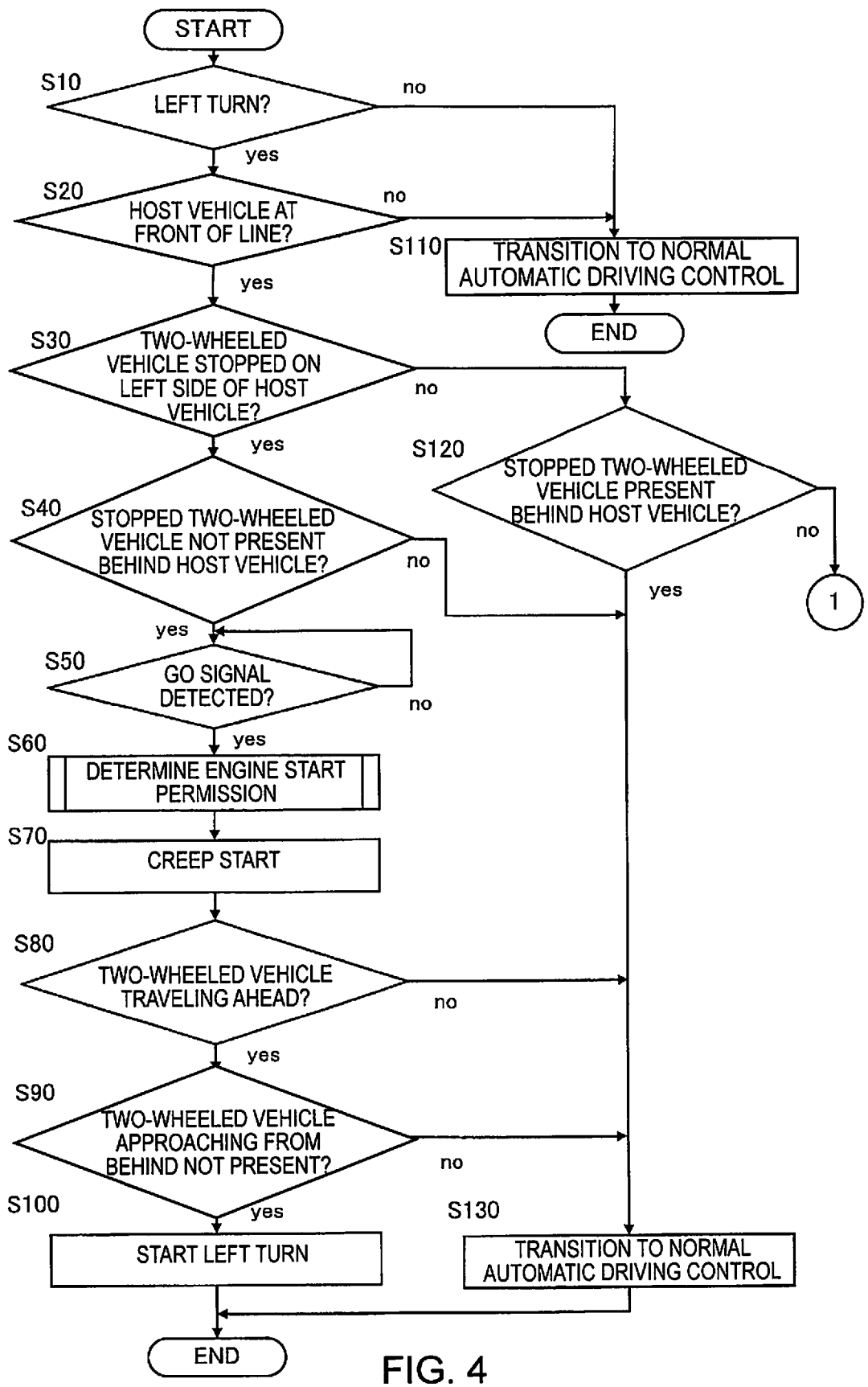
FIG. 4 is a flow chart illustrating a control routine when turning left.

Reference is again made to the explanation of the flow chart of FIG. 4.

When the engine is restarted in accordance with the subroutine of Step S60, the control unit 9 executes a creep start in Step S70. A creep start here is not limited to a creep start in the strict sense in which the vehicle starts moving using only creep torque. In normal automatic drive control, the target vehicle speed is set in accordance with the speed limit and in relation to the preceding vehicle, and the movement of the vehicle is started with a target acceleration set in accordance with the target vehicle speed; but in the present embodiment, a creep start includes the case in which the movement of the vehicle is started with an acceleration that is less than the target acceleration set in this way.

In Step S80, the control unit 9 determines by using the camera 2 or the radar 3 whether the two-wheeled vehicle 11 is traveling ahead of the host vehicle 10. If the two-wheeled vehicle 11 is traveling ahead, the control unit 9 executes the process of Step S90; otherwise, there is a transition to the normal autonomous driving control of Step S130 and the present control routine is ended. Execution of the creep start in Step S70 includes both cases in which the two-wheeled vehicle 11 that was stopped on the left side of the host vehicle 10 has started moving and cases in which the two-wheeled vehicle 11 has not started moving. If the two-wheeled vehicle 11 has started moving, it is likely that the two-wheeled vehicle 11 will pass through the left turn point C before the host vehicle 10, as described above; but if the two-wheeled vehicle 11 has not started moving, it is remains unclear which vehicle, the host vehicle 10 or the two-wheeled vehicle 11, will pass through the left turn point C first. Therefore, by performing the process of Step S80, it is possible to determine whether it is appropriate to initiate a left turn, as described further below, or to transition to normal autonomous driving control.

In Step S90, the control unit 9 determines by using the camera 2 or the radar 3 whether a two-wheeled vehicle 11 is approaching from behind, and, if not, initiates a left turn in Step S100 and then ends the present control routine, and, if so, transitions to the normal autonomous driving control in Step S130 and ends the present control routine.

Figure 6:
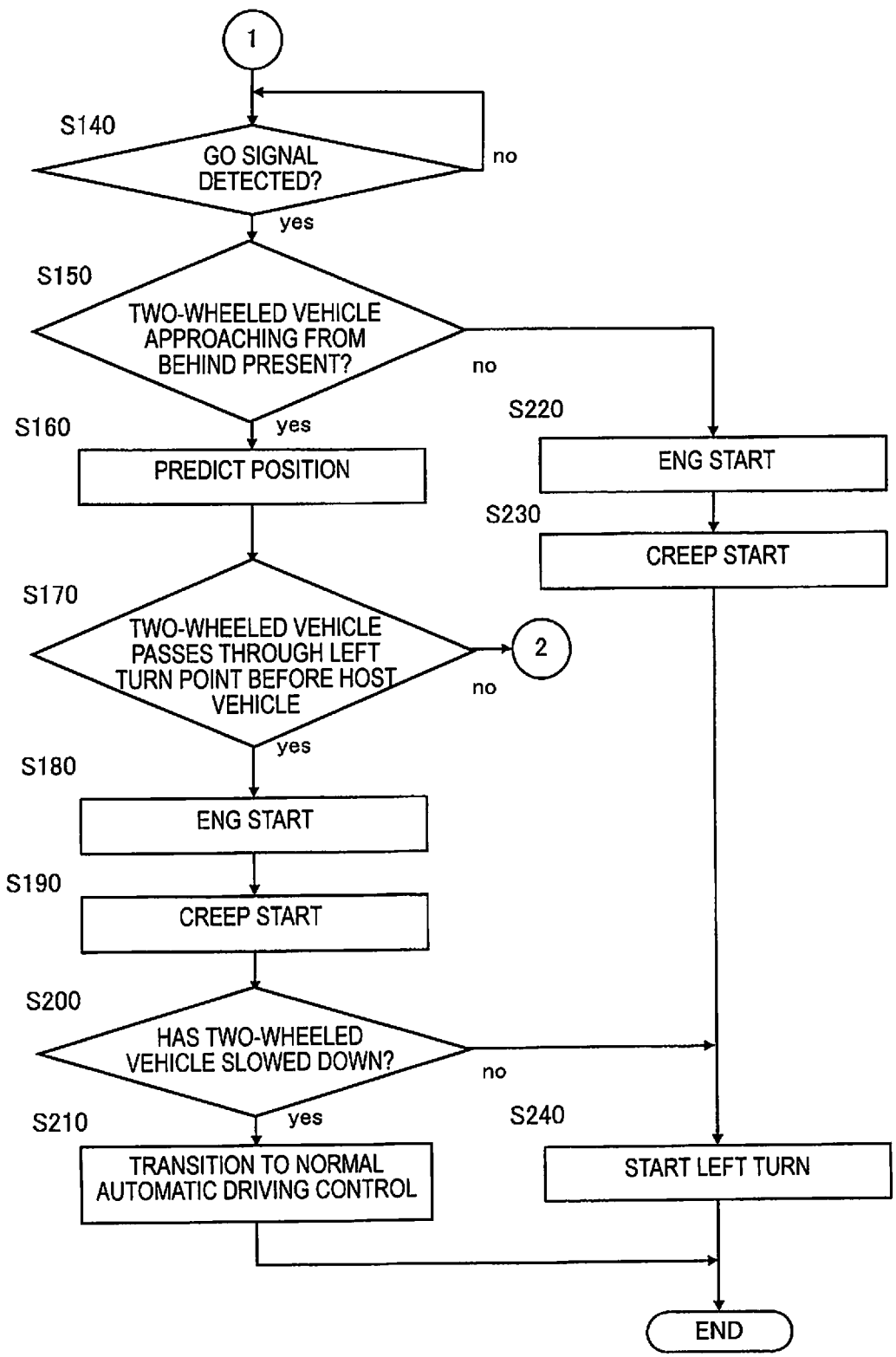
FIG. 6 is a flow chart illustrating a control routine when turning left.

In addition, in Step S120, which is executed when it was determined in Step S30 that a two-wheeled vehicle 11 is not stopped on the left side of the host vehicle 10, the control unit 9 determines whether a two-wheeled vehicle 11 is stopped behind the host vehicle 10. Behind here has the same meaning as behind in Step S40. If there is a two-wheeled vehicle 11 stopped behind, the control unit 9 transitions to the normal autonomous driving control of Step S130 and ends the present control routine, and, if not, the process of Step S140 in FIG. 6 is executed.

In Step S140, the control unit 9 determines whether the traffic light 12 has changed to a go signal, in the same manner as in Step S50, executes the process of Step S150 when it has changed, and repeats the process of Step S140 otherwise.

In Step S150, the control unit 9 determines by using the camera 2 or the radar 3 whether a two-wheeled vehicle 11 is approaching from behind; if so, the control unit executes the process of Step S160, and, if not, the control unit executes the process of Step S220.

In Step S160, the control unit 9 executes position prediction. Position prediction refers to predicting the position of the two-wheeled vehicle 11 at the time that the host vehicle 10 reaches the left turn point C. Specifically, the control unit 9 makes a prediction in accordance with the following procedure.

First, the left turn point C, which is the point of intersection of the travel route A of the host vehicle 10 and the travel route B of the two-wheeled vehicle 11, is set based on map information provided in the navigation system 4. The time required for the host vehicle 10 to reach the left turn point C is then computed based on the distance from the current position to the left turn point C and the acceleration of the host vehicle 10. The vehicle speed of the two-wheeled vehicle 11 detected by the radar 3 is then used to estimate the distance that the two-wheeled vehicle 11 would travel in the time required for the host vehicle 10 to reach the left turn point C. If this distance and the current position of the two-wheeled vehicle 11 detected by using the camera 2 or the radar 3 are known, it is possible to predict where the two-wheeled vehicle 11 will be when the host vehicle 10 reaches the left turn point C if the host vehicle 10 starts moving at the current point in time.

Figure 7:
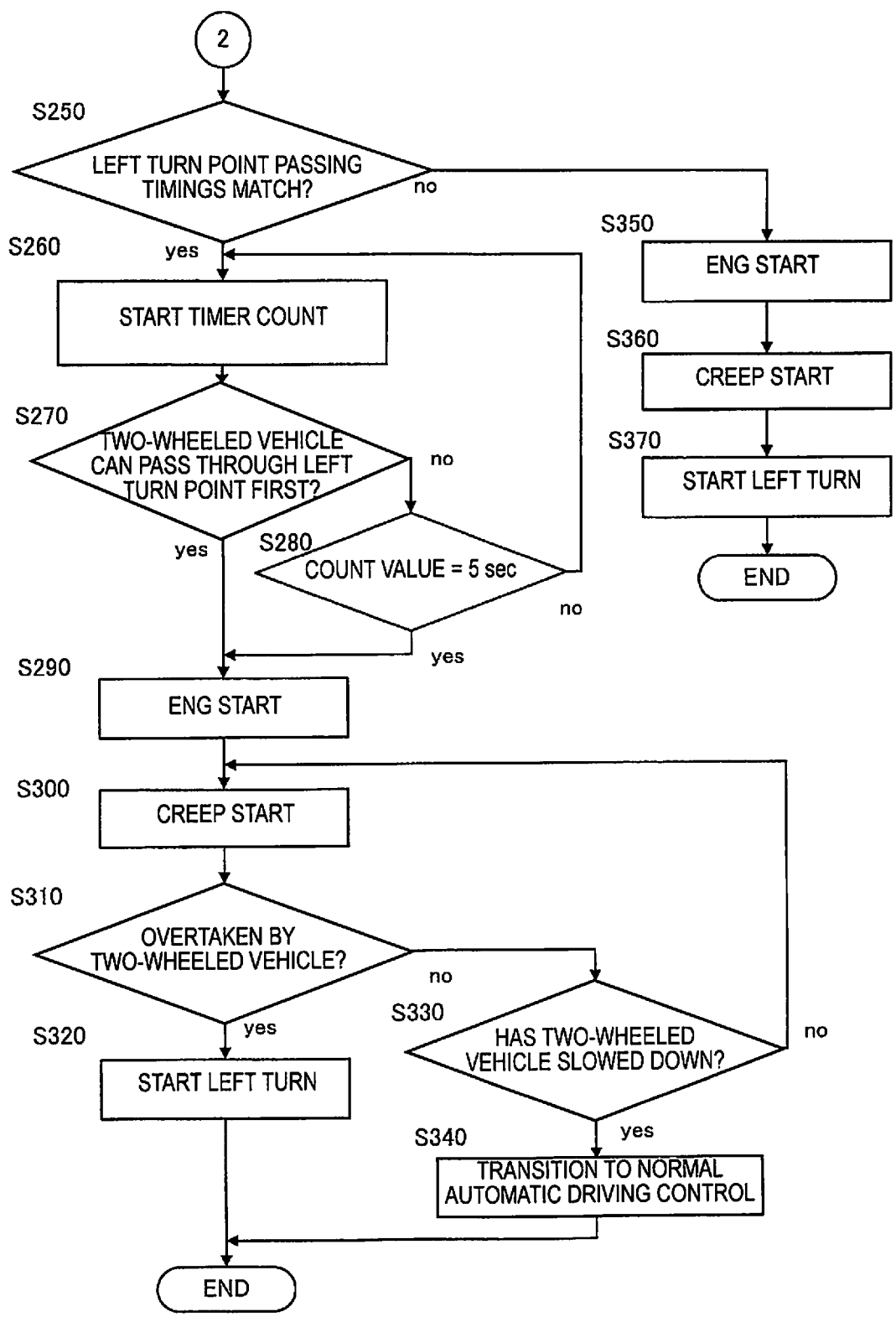
FIG. 7 is a flow chart illustrating a control routine when turning left.

In Step S170, the control unit 9 determines whether the host vehicle 10 will pass through the left turn point C before the two-wheeled vehicle 11 based on the position of the two-wheeled vehicle 11 predicted in Step S160. If the two-wheeled vehicle 11 will pass through the left turn point C before the host vehicle 10, the process of Step S180 is executed; otherwise, the process of Step S250 of FIG. 7 is executed.

The control unit 9 restarts the engine in Step S180 and executes a creep start in Step S190.

After the creep start, in Step S200, the control unit 9 determines by using the camera 2 or the radar 3 whether the two-wheeled vehicle 11 has slowed down. If the two-wheeled vehicle 11 has slowed down, the predicted position result in Step S160 is changed; thus, the determination result in Step S170 could change. Therefore, by using the process of Step S200, the control unit 9 determines the presence or absence of the possibility that the determination result of Step S170 has changed.

If the two-wheeled vehicle 11 has slowed down, the control unit 9 transitions to the normal autonomous driving control of Step S210 and ends the present control routine. That is, if the reliability of the determination result of Step S170 has decreased due to the slowing down of the two-wheeled vehicle 11, there is a shift to normal autonomous driving control. As described above, in the normal autonomous driving control, the host vehicle 10 is stopped when the approach of an obstacle is detected. Therefore, even in a situation in which the host vehicle 10 and the two-wheeled vehicle 11 would reach the left turn point C at almost the same time due to the slowing down of the two-wheeled vehicle 11, since the control unit 9 would detect the approaching two-wheeled vehicle 11 and stop the host vehicle 10, safety can be ensured.

On the other hand, if the two-wheeled vehicle 11 has not slowed down, the control unit 9 starts the left turn in Step S240 and ends the present control routine.

In addition, if it is determined that the two-wheeled vehicle 11 is not approaching from behind in Step S150, the control unit 9 restarts the engine in Step S220, executes a creep start in Step S230, starts the left turn in Step S240, and ends the present control routine.

In Step S250 of FIG. 7, the control unit 9 determines whether the timings at which the host vehicle 10 and the two-wheeled vehicle 11 pass through the left turn point C match based on the result of the position prediction in Step S160. If the timings match, the control unit 9 executes the process of Step S260. If the timings do not match, the control unit 9 restarts the engine in Step S350, executes a creep start in Step S360, starts the left turn in Step S370, and ends the present control routine. That is, if the timings do not match, the host vehicle 10 can pass through the left turn point C before the two-wheeled vehicle 11; thus, the control unit 9 starts the host vehicle 10 to perform the left turn.

In Step S250, the control unit 9 determines a "match" not only when the timings at which the host vehicle 10 and the two-wheeled vehicle 11 pass through the left turn point C exactly coincide, but also in cases in which the two-wheeled vehicle 11 is positioned within approximately 10 m ahead of the left turn point C at the timing at which the host vehicle 10 reaches the left turn point C. This is to ensure that the driver of the two-wheeled vehicle 11 can stop the two-wheeled vehicle 11 ahead of the left turn point C if the driver of the two-wheeled vehicle sees the host vehicle 10 approaching the left turn point C and applies the brakes. That is, a case in which the timings for passing through the left turn point C are determined not to match in Step S250 is one in which it is determined that the host vehicle 10 would pass through the left turn point C before the two-wheeled vehicle 11, in which case the control unit 9 starts the movement of the host vehicle 10 and carries out the left turn (Steps S350-S370). However, because the driver of the two-wheeled vehicle 11 does not know the position prediction result of the control unit 9, the driver of the two-wheeled vehicle may apply the brakes when he or she sees the host vehicle 10 approaching the left turn point C. Therefore, a margin is provided such that the two-wheeled vehicle 11 can stop ahead of the left turn point C, as described above in order to ensure safety. In the present embodiment, the above-mentioned margin is set to about 10 m, which was set based on an assumed average vehicle speed for the two-wheeled vehicle 11 traveling on the side of a line of vehicles and an average deceleration capability of the two-wheeled vehicle 11, but the invention is not limited thereto. For example, a distance that would not frighten the driver of the two-wheeled vehicle 11 may be evaluated by simulation, or the like, which may be used as the margin.

In Step S260, the control unit 9 keeps the restarting of the engine on standby, and starts the count of a built-in timer.

In Step S270, the control unit 9 carries out the same process as in Steps S160 and S170 in order to determine whether it has become possible for the two-wheeled vehicle 11 to pass through the left turn point C before the host vehicle 10. If it has become possible for the two-wheeled vehicle 11 to pass through the left turn point C first, the control unit 9 restarts the engine in Step S290 and executes a creep start in Step S300. On the other hand, if it has not become possible for the two-wheeled vehicle 11 to pass through the left turn point C first, it is determined whether the count value has reached 5 seconds in Step S280, the process of Step S290 is executed if it has reached 5 seconds, and otherwise the processes of Steps S260 and S270 are repeatedly executed.

That is, since the timings at which the host vehicle 10 and the two-wheeled vehicle 11 pass through the left turn point C would match if the host vehicle 10 were to start moving at the current point in time, the restarting of the engine is placed on standby until the two-wheeled vehicle 11 would be able to pass through the left turn point C before the host vehicle 10. However, not starting the vehicle indefinitely after a change to a go signal would hinder the smooth flow of traffic, so that an upper limit for the standby time is set. Here, it is set to 5 seconds in the same manner as in Step S604, but the invention is not limited thereto. Since it is determined that the timings at which the host vehicle 10 and the two-wheeled vehicle 11 pass through the left turn point C match in Step S250, by slightly shifting the start of travel timing of the host vehicle 10, it becomes possible for the two-wheeled vehicle 11 to pass through the left turn point C first. Therefore, a shorter time than that in Step S604 may be set.

After the creep start of the host vehicle in Step S300, in Step S310, the control unit 9 determines by using the camera 2 or the radar 3 whether the host vehicle has been overtaken by the two-wheeled vehicle 11. If the host vehicle has been overtaken, the control unit 9 initiates the left turn in Step S320. The creep start carried out in Step S300 includes both those cases in which it has become possible for the two-wheeled vehicle 11 to pass through the left turn point C first, and those cases in which it has not become possible for the two-wheeled vehicle 11 to pass through the left turn point C first but the upper limit of the standby time has reached. However, a left turn can be made safely by determining whether the host vehicle has been overtaken by the two-wheeled vehicle 11 in Step S310.

On the other hand, if the host vehicle has not been overtaken, the control unit 9 executes the process of Step S330.

In Step S330, the control unit 9 determines by using the camera 2 or the radar 3 whether the two-wheeled vehicle 11 has slowed down. If the two-wheeled vehicle 11 has slowed down, the control unit 9 transitions to normal autonomous driving control in Step S340 and then ends the present control routine. An example of a case in which the host vehicle has not been overtaken by the two-wheeled vehicle 11 (Step S310) and the two-wheeled vehicle 11 has slowed down (Step S330) is one in which the approaching two-wheeled vehicle 11 stops. Here, the control unit 9 cannot determine whether the driver of the two-wheeled vehicle 11 intends to let the host vehicle 10 go first. Therefore, ensuring safety is prioritized, and there is a transition to normal autonomous driving control. If the host vehicle 10 starts moving by using normal autonomous driving control, even if the two-wheeled vehicle 11 starts moving and the distance between the host vehicle 10 and the two-wheeled vehicle 11 decreases, under normal autonomous driving control, it can be determined that an obstacle is approaching so that the host vehicle 10 is stopped and safety can be ensured.

On the other hand, if the two-wheeled vehicle 11 has not slowed down, the control unit 9 returns to the process of Step S300. That is, while continuing creep travel, the control unit waits until the host vehicle is overtaken by the two-wheeled vehicle 11 (Steps S300, S310). This is because if the two-wheeled vehicle 11 is not slowing down and if the host vehicle 10 continues creep travel, the two-wheeled vehicle 11 will eventually overtake the host vehicle 10. Then, if the left turn is carried out after the vehicle is overtaken by the two-wheeled vehicle 11 (Step S320), safety can be ensured. Therefore, the main purpose of the creep start in Step S300 is to save time while allowing the two-wheeled vehicle 11 to go first. In contrast, the creep start in Steps S70, S230, and S360 is for improving fuel efficiency at the time of starting. Although the main purpose of the creep start in Step S70 is to improve fuel efficiency, as described above, it also achieves the effect of more reliably ensuring that the two-wheeled vehicle 11 that was stopped on the left side of the host vehicle 10 will go first.

The effects obtained by the present embodiment will be summarized next.

In the present embodiment, when the host vehicle 10 is stopped at the front of a line of vehicles in accordance with a stop signal of the traffic light 12 at an intersection, the engine is stopped due to IS control, and when the host vehicle is to perform a left-turn operation on a left-hand traffic road or a right-turn operation on a right-hand traffic road at the intersection after the traffic light 12 changes to a go signal, the presence or absence of a two-wheeled vehicle 11 (traveling body) that is stopped on the side of or behind the host vehicle in the direction from which the host vehicle 10 is turning, is detected during the stop signal. Then, if there is a two-wheeled vehicle 11 on the side of host vehicle, the restarting of the engine is placed on standby even when the traffic light 12 changes to a go signal, and the engine is restarted in accordance with the behavior of the two-wheeled vehicle 11. As a result, the possibility of stopping again once inside the intersection in order to ensure safety in relation to the two-wheeled vehicle 11 is reduced. That is, it is possible to minimize the deterioration of fuel efficiency due to an idle stop being carried out unnecessarily, or due to not being able to execute an idle stop after stopping again.

In the present embodiment, if a two-wheeled vehicle 11 is stopped on the left side of the host vehicle 10, it is detected whether the two-wheeled vehicle 11 has started moving after the traffic light 12 changes to a go signal; if it has started moving, the engine is promptly restarted; and if it has not started moving, the engine is restarted after a prescribed period of time has elapsed. It is thus possible to avoid obstructing the smooth flow of traffic while minimizing the deterioration of fuel efficiency, as described above.

In the present embodiment, if a two-wheeled vehicle 11 is not stopped on the left side of or behind the host vehicle 10 during a stop signal, it is detected whether a two-wheeled vehicle 11 is approaching from behind in the direction from which the host vehicle 10 is turning after the traffic light 12 changes to a go signal. Then, if there is a two-wheeled vehicle 11 approaching, the engine is restarted after a prescribed period of time has elapsed. It is thus possible to prevent the times at which the host vehicle 10 and the two-wheeled vehicle 11 pass through the left turn point C from coinciding.

In the present embodiment, when an automatic starting control is executed in which the starting of the vehicle is automatically carried out, and a two-wheeled vehicle 11 is approaching from behind the host vehicle 10 so that the engine is restarted after a prescribed period of time has elapsed, after the engine is restarted, a creep start of the vehicle is executed. A left turn is thus possible after the two-wheeled vehicle 11 is allowed to go ahead.

In the present embodiment, when the host vehicle 10 is stopped at the front of a line of vehicles in accordance with a stop signal of the traffic light 12 at an intersection, the engine is stopped due to IS control, and when the vehicle is to perform a left-turn operation on a left-hand traffic road or a right-turn operation on a right-hand traffic road at the intersection after the traffic light 12 changes to a go signal, the presence or absence of a two-wheeled vehicle 11 (traveling body), which is stopped on the side of or behind the host vehicle in the direction from which the host vehicle 10 is turning, is detected during the stop signal. Then, if there is a two-wheeled vehicle 11 on the side of host vehicle, the engine is restarted to perform a creep start when the traffic light 12 changes to a go signal. As a result, the probability that the host vehicle will stop again once inside the intersection in order to ensure safety in relation to the two-wheeled vehicle 11 is reduced. In other words, it is possible to minimize the deterioration of fuel efficiency due to an idle stop being carried out unnecessarily and due to not being able to an execute idle stop after stopping again.

In the present embodiment, it is assumed that the engine is restarted in order to perform a creep start when the traffic light 12 changes to a go signal, and it is determined whether it is possible for the two-wheeled vehicle 11 to pass through the intersection ahead of the host vehicle 10. Then, if it is determined that it is possible, the engine is restarted to perform a creep start when the traffic light 12 changes to a go signal; and if it is determined that it is not possible, the engine is restarted to perform a creep start after a prescribed period of time has elapsed after the traffic light 12 has changed to a go signal. Obstruction of the smooth flow of traffic can thus be avoided.

A case in which autonomous driving control is executed has been described in the present embodiment, but the invention is not limited thereto. For example, in the case of manual driving, when there is a change to a go signal and the driver removes his or her foot from the brake pedal, the restarting of the engine may be placed on standby in accordance with the above-described control routine, or the engine may be immediately restarted. However, if the restarting of the engine is placed on standby, the driver should be made aware of the fact that the engine restart has been placed on standby due to the relationship of the vehicle to the two-wheeled vehicle 11.

Embodiments of the present invention were described above, but the above-described embodiments illustrate only some of the application examples of the present invention, and are not intended to limit the technical scope of the present invention to the specific configurations of the above-described embodiments.

The invention claimed is:

1. A vehicle control method for executing an idle stop control for stopping an engine upon an idle stop permission condition being met, the vehicle control method comprising:
stopping the engine by using the idle stop control when a host vehicle is stopped at a front of a line of vehicles in accordance with a stop signal of a traffic light at an intersection, and when either a left-turn operation of the vehicle on a left-hand traffic road or a right-turn operation on a right-hand traffic road at the intersection will be made after the traffic light changes to a go signal;
detecting, during the stop signal, a presence or an absence of a traveling body that is stopped on a side of or behind the host vehicle in a direction from which the host vehicle is turning; and
upon determining that the traveling body is stopped on the side of the host vehicle in the direction from which the host vehicle is turning,
placing restarting of the engine on standby even when the traffic light changes to the go signal,
detecting whether the traveling body has started moving after the traffic light changes to the go signal,
measuring an amount of time elapsed since the traffic light changed to the go signal, and
restarting the engine when the amount of time elapsed reaches a prescribed period of time if the traveling body has not started moving.

2. The vehicle control method according to claim 1, wherein
upon determining the traveling body is not stopped on the side of or behind the host vehicle in the direction from which the host vehicle is turning during the stop signal,
detecting whether a traveling body is approaching from behind in the direction from which the host vehicle is turning after the traffic light changes to the go signal, and
restarting the engine after a prescribed period of time has elapsed if the traveling body is approaching.

3. The vehicle control method according to claim 2, wherein
when executing an autonomous driving control for automatically starting the vehicle, performing a creep start after the engine is restarted.

4. A vehicle control method for executing an idle stop control for stopping an engine upon an idle stop permission condition being met, the vehicle control method comprising:
stopping the engine by using the idle stop control when a host vehicle is stopped at a front of a line of vehicles in accordance with a stop signal of a traffic light at an intersection, and when either a left-turn operation of the vehicle on a left-hand traffic road or a right-turn operation on a right-hand traffic road at the intersection will be made after the traffic light changes to a go signal;
detecting, during the stop signal, a presence or an absence of a traveling body that is stopped on a side of or behind the host vehicle in a direction from which the host vehicle is turning;
determining whether the traffic light has changed to the go signal;
determining whether the traveling body can pass through the intersection ahead of the host vehicle upon determining that the traffic light has changed to the go signal and that the traveling body is stopped on the side of the host vehicle; and
restarting the engine to perform a creep start upon determining that the traveling body can pass through the intersection ahead of the host vehicle, and measuring an amount of time elapsed since the traffic light changed to the go signal and restarting the engine to perform the creep start when the amount of time elapsed reaches a prescribed period of time upon determining that the traveling body cannot pass through the intersection ahead of the host vehicle.

5. A vehicle control device comprising:
a traveling body detection unit configured to detect a traveling body in a vicinity of a host vehicle;
a signal detection unit configured to detect a state of a traffic light in a direction of travel of the host vehicle; and
a control unit configured to execute an idle stop control to stop an engine upon an idle stop permission condition being met,
when the signal detection unit detects that the traffic light at an intersection is a stop signal, the control unit stops the host vehicle in accordance with the stop signal and stops the engine by using the idle stop control, and when the traveling body detection unit detects that the host vehicle is at a front of a line of vehicles, the host vehicle performs either a left-turn operation on a left-hand traffic road or a right-turn operation on a right-hand traffic road at the intersection after the traffic light turns to a go signal,
the traveling body detection unit detects, during the stop signal, a presence or an absence of a traveling body that is stopped on a side of or behind the host vehicle in a direction from which the host vehicle is turning, and
upon determining that the traveling body is stopped on the side of host vehicle in the direction from which the host vehicle is turning, the control unit
places restarting of the engine on standby even when the traffic light turns to the go signal,
detects whether the traveling body has started moving after the traffic light changes to the go signal,
measures an amount of time elapsed since the traffic light changed to the go signal, and
restarts the engine when the amount of time elapsed reaches a prescribed period of time if the traveling body has not started moving.

6. A vehicle control device comprising:
a traveling body detection unit configured to detect a traveling body in a vicinity of a host vehicle;
a signal detection unit configured to detect the state of a traffic light in a direction of travel of the host vehicle; and
a control unit configured to execute an idle stop control to stop an engine upon an idle stop permission condition being met,
when the signal detection unit detects that the traffic light at an intersection is a stop signal, the control unit stopping the host vehicle in accordance with the stop signal and stopping the engine by using the idle stop control, and when the traveling body detection unit detects that the host vehicle is at a front of a line of vehicles, the host vehicle performing either a left-turn operation on a left-hand traffic road or a right-turn operation on a right-hand traffic road at the intersection after the traffic light turns to a go signal, during the stop signal, the control unit determining whether the traveling body detection unit detects, during the stop signal, a presence or an absence of a traveling body that is stopped on a side of or behind the host vehicle in a direction from which the host vehicle is turning, determining whether the traffic light has changed to the go signal, determining whether the traveling body can pass through the intersection ahead of the host vehicle upon determining that the traffic light has changed to the go signal and that the traveling body is stopped on the side of the host vehicle, restarting the engine to perform a creep start upon determining that the traveling body can pass through the intersection ahead of the host vehicle, and measuring an amount of time elapsed since the traffic light changed to the go signal and restarting the engine to perform the creep start when the amount of time elapsed reaches a prescribed period of time upon determining that the traveling body cannot pass through the intersection ahead of the host vehicle.

* * * * *